US005103700A

United States Patent [19]

Read, Sr.

[11] Patent Number: 5,103,700

[45] Date of Patent: Apr. 14, 1992

[54] FACEPLATE ASSEMBLY FOR WOOD TURNING AND METHOD OF USE

[76] Inventor: John H. Read, Sr., Rte. 2, Box 207, Monticello, Fla. 32344

[21] Appl. No.: 484,208

[22] Filed: Feb. 23, 1990

[51] Int. Cl.[5] ........................ B23B 33/00; B27C 7/04

[52] U.S. Cl. ........................ 82/165; 142/53

[58] Field of Search ........................ 82/165; 142/48, 53, 142/55-57; 279/1 A, 1 B, 1 ME

[56] References Cited

U.S. PATENT DOCUMENTS

| | | | |
|---|---|---|---|
| 2,556,595 | 6/1951 | McNickle | 82/165 |
| 2,655,829 | 10/1953 | Fiorino | 82/165 |
| 4,061,076 | 12/1977 | Robertson | 279/1 A |
| 4,541,465 | 9/1985 | Leadbeatter | 142/55 |

FOREIGN PATENT DOCUMENTS

| | | | |
|---|---|---|---|
| 182225 | 3/1907 | Fed. Rep. of Germany | 142/55 |
| 161028 | 4/1921 | United Kingdom | 142/53 |

OTHER PUBLICATIONS

Robert Porby Ltd., "Precision Combination Chuck Manual", 1987, p. 13.

*Primary Examiner*—Larry I. Schwartz
*Assistant Examiner*—Kevin J. Carroll
*Attorney, Agent, or Firm*—Dominik, Stein, Saccocio, Reese, Colitz & VanDerwall

[57] ABSTRACT

A work holding assembly for performing turning operations on a lathe and its method of use, the assembly having a faceplate member detachable from a hub member, where the hub member is attached to the spindle of the lathe and the wooden workpiece is attached to the faceplate member. The faceplate member is detachable from the hub member without removing the workpiece from the faceplate member or removing the hub member from the lathe. The hub member is adapted to receive any of a number of similar faceplates. Further, the faceplate member is attachable to any of a number of different hub members, each hub member being adapted to fit onto a different size or shape lathe spindle.

1 Claim, 2 Drawing Sheets

FACEPLATE ASSEMBLY FOR WOOD TURNING AND METHOD OF USE

BACKGROUND OF THE INVENTION

The invention relates generally to the field of faceplate assemblies used to hold a workpiece for wood turning operations, and more specifically to the field of faceplate assemblies of non-unitary construction, where the workpiece holding member is separable from the lathe attachment member. The invention further relates to a method of wood turning where the steps of separation and reattachment of the workpiece holding member from the lathe attachment member are part of the method.

In wood turning operations the workpiece, i.e., a piece of wood to be shaped, is attached to a lathe. The workpiece is then rotated while various cutting or scraping implements are pressed against the workpiece to remove the undesired wood to shape the workpiece into the final product, such as a bowl or a vase. The rotation method assures much greater symmetry than trying to carve from a stationary workpiece. Because of the rotation speeds and the pressure exerted against the workpiece during the shaping process, a secure attachment of the workpiece to the lathe is essential. One of the standard mechanisms for attaching the workpiece to the lathe is a one-piece work holder consisting of an internally threaded mounting hub centered on the back of a relatively larger diameter planar disk. The hub threads onto the threaded spindle of the lathe itself and the workpiece is attached to the planar surface of the disk by suitable method, such as screws inserted through apertures in the disk or adhesive. When the lathe spindle is not threaded, another standard mechanism is a one piece work holder of hub and disk having a set screw mounted in the hub for tightening into the side of the lathe spindle. Still another standard mechanism, used with lathe spindles which are tubular, with the internal opening tapering inwardly, is to insert a one-piece work holder having a tapered shaft into the spindle, where it is held in place by friction.

While a standard one-piece work holder is adequate with regard to securing the workpiece to the lathe, its use presents numerous inconveniences and problems. These problems are overcome by the invention. When performing wood turning operations it is often necessary to remove the workpiece from the lathe a number of times. This can be for any of several reasons. For example, it is often desirable to begin working with green wood, i.e., wood that has not been fully dried, since the cutting and shaping operations can be performed more effectively. At various stages during the wood turning process, the wood must be allowed to dry, which can take anywhere from three weeks to three months depending on the remaining thickness of the wood. To work on a number of pieces, a worker using a one-piece work holder must either have a large number of relatively expensive work holders, or the individual work holder must be removed from the workpiece during this drying period and used on another workpiece. Removal of the work holder causes two problems. Since the wood is now no longer attached to the planar surface of the disk, it usually warps during the drying stage. This requires the workpiece to be planed down and re-centered prior to reattachment. Also, removing the workpiece and reattaching it to the work holder results in a weaker attachment, since the screw holes in the bottom of the workpiece become enlarged or softened. This is dangerous to the worker, should the workpiece fly loose from the lathe during the turning operations.

Another situation requiring removal of the workpiece form the lathe is where a number of workers must use the same lathe. This can occur, for example, in a school or small industrial shop setting. Again, unless a number of work holders are kept available, a one-piece work holder requires that each individual workpiece be removed and reattached numerous times, so that the work holders are available to other users for their workpieces. Additionally, there are situations where a shop has a number of lathes of different makes or dimensions, each having a different size attachment spindle. To work the workpieces on different lathes, the worker must detach the workpiece from a work holder of one particular hub size and attach a work holder of differing hub size.

The invention solves these and other problems by providing a device and a method of wood turning using the device where the workpiece is never detached from the work holding member of the device. The device comprises a workpiece holding faceplate which is removably attachable to a mounting hub. The faceplate can be attached to any hub, even hubs of different size for use with different lathes. The faceplates can be produced for one-fifth to one-tenth the cost of the one-piece work holders, so a school or shop can economically have a large number of faceplates on hand to be used with a small number of hubs, since only one hub per lathe is be required. Since the faceplates remain attached to the work pieces throughout the operation, the problems of warping and unsafe reattachment are alleviated.

It is an object of the invention to provide a work holding assembly comprising a faceplate removable from and reattachable to a lathe mounting hub, such that the faceplate remains attached to the workpiece when removed from the lathe and the hub remains mounted on the lathe.

It is a further object to provide such an assembly where any one of a number of similar faceplates can be attached to a hub.

It is a further object to provide such an assembly where the faceplate can be attached to any one of a number of different hubs sized for particular lathes.

It is another object of the invention to provide a method of wood turning utilizing an assembly comprising a faceplate removable from a lathe mounting hub, such that the faceplate remains attached to the workpiece when removed from the lathe and the hub remains mounted on the lathe, the faceplate and workpiece to be remounted on the lathe hub at a later time.

BRIEF SUMMARY OF THE INVENTION

The invention is a work holding assembly for use with a wood turning lathe, comprising a detachable faceplate member, a mounting hub member, and connection means to detachably join the two. The faceplate member has an outer planar surface and hub attachment means for securing the faceplate member to the hub member, where the hub attachment means provides for removal and reattachment of the faceplate member to and from said hub member. The faceplate member further comprises workpiece mounting means for securing a workpiece to the faceplate member. The hub attachment means is structured to allow removal of the faceplate member from the hub without requiring removal of the workpiece from the faceplate member. The hub member comprises faceplate attachment means which correspond to the hub attaching means of the faceplate member, together forming the connection means for detachably joining the faceplate member to the hub member. The hub member further comprises spindle mounting means for connecting the hub member to the lathe. Additionally, an axial workpiece mounting member can be removably attached to the hub member.

The invention also is a method of wood turning comprising the steps of mounting a hub member onto the spindle of a wood turning lathe, attaching a workpiece to a faceplate member, attaching the faceplate member to the hub member, performing wood shaping operations on the workpiece, removing the faceplate member from the hub member for a period of time, reattaching the faceplate member to the hub member, and performing additional wood shaping operations on the workpiece. Furthermore, the method may also comprise the initial steps of attaching an axial workpiece mounting member to the hub member, temporarily mounting the top side of the workpiece to the axial workpiece mounting member, planing down the bottom side of the workpiece, removing the workpiece from the axial workpiece mounting member, removing the axial workpiece mounting member from the hub member, all prior to the step of attaching the bottom side of the workpiece to the faceplate member.

DETAILED DESCRIPTION OF THE INVENTION

Figure 1:
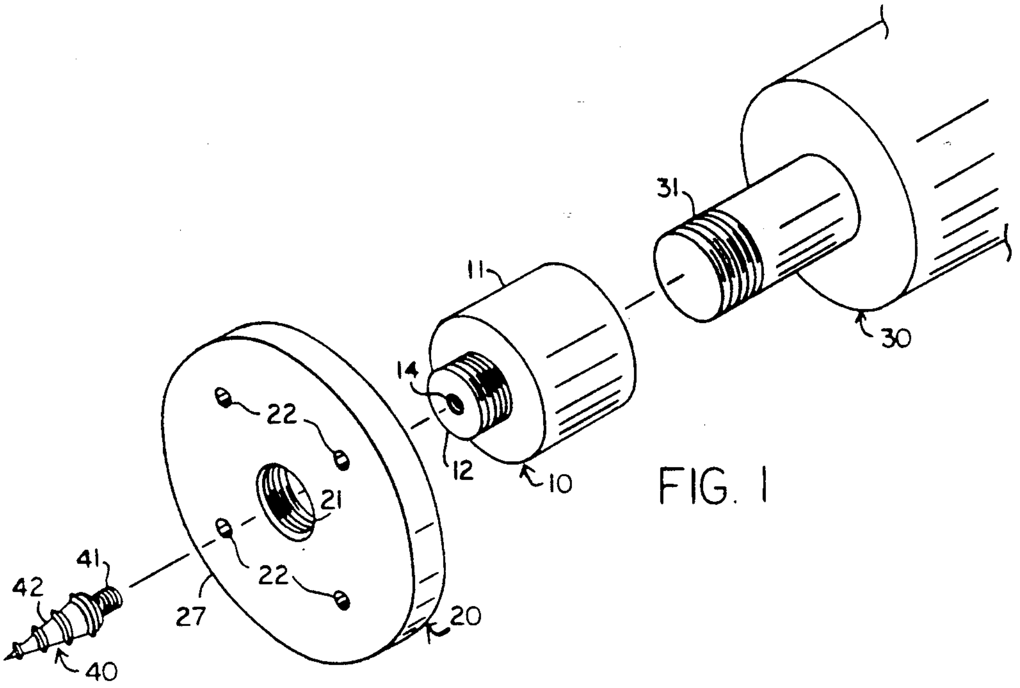
FIG. 1 is an exploded isometric view showing the relative positions of the lathe spindle, hub member, faceplate member and axial workpiece mounting member.
Figure 3:
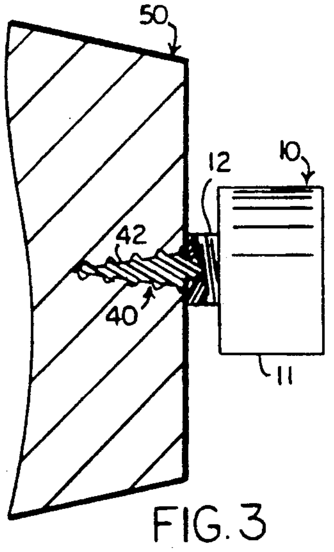
FIG. 3 is a side view, partially in cut-away, showing a workpiece mounted onto the axial workpiece mounting member.

The device is shown generally in FIG. 1, where the expanded drawing illustrates the main components of the faceplate assembly. As shown, the invention comprises a hub member 10 and a faceplate member 20, each adapted so as to be attachable and detachable to each other. Hub member 10 is adapted so as to be attachable to a lathe 30. Additionally, axial workpiece mounting member 40 may be attached to hub member 10.

Figure 2:
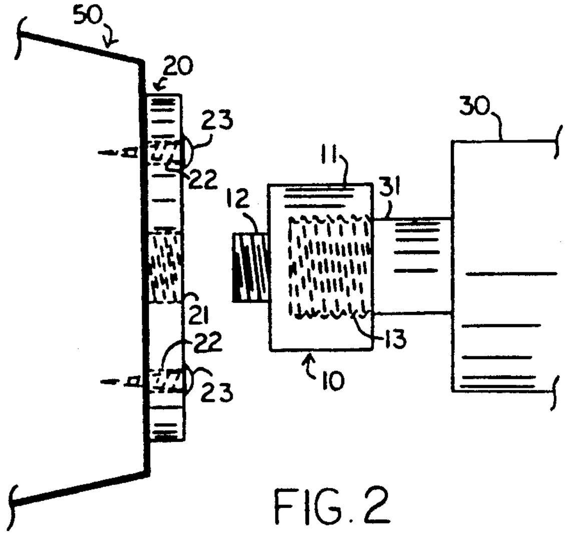
FIG. 2 is a side view showing a workpiece attached to the faceplate member, as removed from the hub member.
Figure 7:
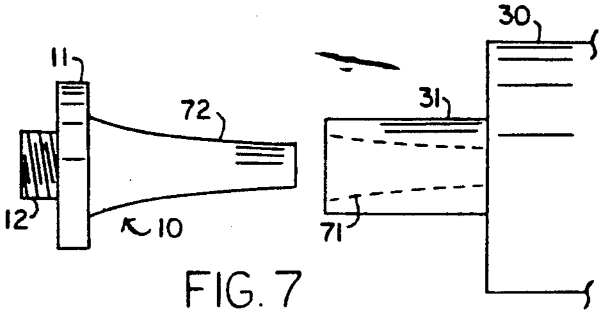
FIG. 7 is a side view showing a tubular lathe spindle and the corresponding hub member.

In common practice, lathe 30 has a rotating spindle 31 to which a mounting attachment is attached. The mounting attachment holds a workpiece during the turning operation. The spindle 31 can be a threaded or non-threaded rod, or a threaded or non-threaded tube having a tapered interior. The threaded rod spindle will be discussed as the main example. Hub member 10 is generally cylindrical in shape and comprises a main hub body portion 11, spindle attachment means 13 and a hub spindle 12. The spindle attachment means 13 is an internally threaded cylindrical aperture corresponding to the lathe spindle 31. The hub member 10 is attached to the lathe 30 by screwing it onto spindle 31. Screws or other locking mechanisms well known in the art, not shown, may be used to secure the hub member 10 to the spindle 31. The connected hub member 10 and lathe 30 are shown in FIG. 2. For non-threaded spindles 31, the spindle attachment means 13 is an aperture in hub member 10 sized and shaped to correspond to the particular spindle configuration, and set screws or like mechanisms are used to secure the hub member 10 in place. For tubular lathe spindles 31 having an internal opening 71 which tapers, the opening 71 diminishing in diameter along the spindle 31, as seen in FIG. 7, the corresponding hub member 10 has a tapered shaft 72 which is inserted within the opening 71 and held in place by friction.

Hub spindle 12 is part of the connection means for connecting the hub member 10 to the faceplate member 20. Faceplate member 20 is preferably disk shaped, having a threaded hub spindle aperture 21 located on the central axis. The hub spindle aperture 21 is the other part of the connection means. The threading of the hub spindle aperture 21 corresponds to the threading of the hub spindle 12, such that the faceplate member 20 and the hub member 10 are joined and separated by screwing the faceplate member 20 onto and off of the hub spindle 12 of hub member 10. Faceplate member 20 has a relatively planar outer side 27. The workpiece 50 is attached to this planar side 27 by inserting workpiece mounting screws 23 through a plurality of workpiece mounting apertures 22 which pass completely through faceplate member 20.

Preferably the components of the device are made from steel or like material. The faceplate member 20 can preferably range from three to six inches in diameter and from one quarter to three eighths in thickness. The central hub spindle aperture 21 of the faceplate member 20 is preferably one inch in diameter. The overall size of the hub member 10 depends on the size of the lathe spindle 31. Typical lathe spindles 31 range from five eighths to two inches in diameter. Therefore the larger the lathe spindle 31, the larger the diameter and length of the hub member 10. The hub spindle 12 must correspond to the size, both in diameter and in length, to the diameter and thickness of the hub spindle aperture 21 and faceplate member 20. The hub spindle 12 cannot protrude beyond planar side 27 of the faceplate member 20 after the two components have been connected, or else it would interfere with the workpiece 50.

The method of the invention is to first securely attach the hub member 10 to the lathe 30 by screwing it onto spindle 31, or in the alternative embodiments, fastening it around spindle 31 or inserting the tapered shaft 72 into the spindle 31. Because the device of the invention is a two piece assembly, hub member 10 can be left permanently connected to the lathe 30. The worker next attaches his workpiece 50 to the faceplate member 20 by placing what is to be the bottom of the finished piece against the planar side 27 of faceplate member 20. The bottom of the workpiece 50 has been previously prepared so as to have a relatively planar surface. The workpiece 50 is now attached to the faceplate member 20 by inserting workpiece mounting screws 23 through the workpiece mounting apertures 22 and into the workpiece 50 itself. The workpiece is now securely attached to the planar side 27 of faceplate member 20 and can be left attached to the faceplate member 20 throughout the turning and drying operations. This insures that any warping of the workpiece 50 will be controlled by the faceplate member 20 and also insures that the workpiece is always securely attached to the faceplate member 20.

The workpiece 50 and faceplate member 20 are now attached to the hub member 10 by screwing the faceplate member 20 onto the hub spindle 12 of the hub member 10. A washer may be placed between the faceplate member 20 and the hub member 10 for ease of removal. The workpiece 50 is now securely connected to the lathe 30 and the turning operations are performed. When it is necessary to remove the workpiece 50, either to allow for green wood to dry or to allow other workpieces to be worked, it is removed by unscrewing faceplate member 20 from hub member 10. Hub member 10 remains on the lathe spindle 31 and other faceplate members 20 can now be connected to it and worked in the same manner as above. When it is desired to work on the original workpiece 50 again, the original faceplate member 20 is simply reattached to hub member 10. Apertures for a spanner wrench may be located around the circumference of faceplate member 20 to allow attachment of the wrench for removing the faceplate member 20 from hub member 10.

As a further preferred embodiment, an axial workpiece mounting member 40 can be connected to the hub member 10. When working with small workpieces 50, the diameter of the piece may be of such small size that it must be centrally mounted to the lathe spindle 31 for the turning operations. Additionally, the initial planing operation on the bottom of the workpiece 50 to produce the planar surface can be accomplished with relatively little force, and it is often done by inserting the lathe spindle 31 itself into the piece. This is enough to maintain the piece on the lathe during the planing operation. The axial mounting member 40 performs these tasks much more safely and efficiently.

Axial mounting member 40 comprises a threaded cone or screw portion 42 for insertion into the workpiece 50, and a threaded rod portion 41 for connecting the axial mounting member 40 to the hub member 10. An axial aperture 14 is positioned on the central axis of the hub spindle 12 to receive the threaded rod 41. The axial aperture 14 is an internally threaded hollow cylinder corresponding in size to the threaded rod 41. The worker screws the axial mounting member 40 into the hub member 10, and screws the workpiece 50 onto the threaded cone portion 42. The turning operations are performed and the workpiece 50 is removed, as is axial mounting member 40. The hub member 10 is now ready to receive the faceplate member 20.

Figure 4:
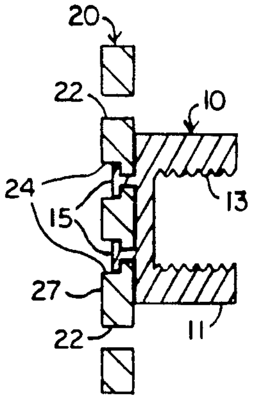
FIG. 4 is a cross-sectional view showing an alternative means for attaching the faceplate member to the hub member, using headed pins and shouldered slots.
Figure 5:
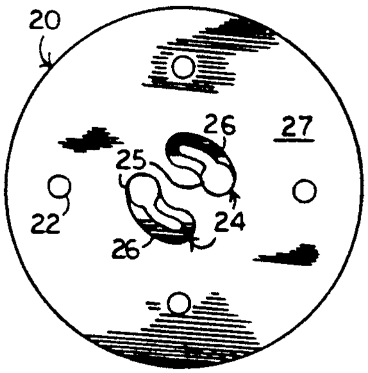
FIG. 5 is an end view of a faceplate member showing the shouldered slots.
Figure 6:
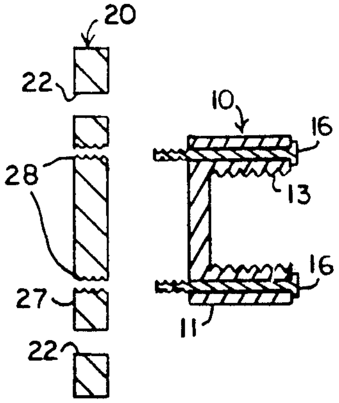
FIG. 6 is a cross-sectional view of still another means for attaching the faceplate member to the hub member, using long bolts.

With reference now to FIGS. 4, 5 and 6, alternative connection means are shown for connecting the faceplate member 20 to the hub member 10. FIGS. 4 and 5 show the threaded hub spindle 12 and hub spindle aperture 21 replaced by connection means comprising a number of headed pins 15 and shouldered slots 24. The headed pins 15 extend from the hub body 11. The shouldered slots 24 are positioned on the faceplate member 20 to correspond to the location of the headed pins 15. The shouldered slots 24 are curved slots each having an ingress opening 25 and detaining shoulders 26. The ingress openings 25 are of sufficient diameter to allow the headed pins to be inserted into the shouldered slots 24. The faceplate member 20 is then rotated relative to the hub member 10 so that the headed pins 15 are retained by the detaining shoulders 26. To remove the faceplate member 20, it is rotated in the opposite direction. As before, the attachment an removal of the faceplate member 20 from the hub member 10 can be accomplished without removing the workpiece 50 from the faceplate member 20.

FIG. 6 shows another embodiment, where the faceplate member 20 is connected to the hub member 10 by a number of threaded bolts 16 inserted through apertures in hub member 10. The ends of the threaded bolts 16 extend beyond hub member 10, and faceplate member 20 is attached by inserting the bolts 16 into threaded apertures 28 located on the back side of faceplate member 20.

While the invention has been described herein by way of illustrating the relationship between the faceplate member 20 and hub member 10, it is also to be understood that the invention includes the combination of a plurality of faceplate members 20 with a single hub member 10 or with plural hub members 10. For instances where lathe spindles 31 vary in diameter, a set of hub members 10, each having a different size lathe spindle aperture 13 for connecting the hub member 10 to a spindle 31, is combined with a plural number of faceplate members 20. Each of the hub members 10, though, will have the same size hub spindle 12 for connecting the hub member 10 to the faceplate member 20. This allows any individual faceplate member 20 to be attached to any individual hub member 10, which mean that a workpiece 50 can be worked on any one of the lathes 30.

It will be understood that the above discussion has been by way of illustration only, and that equivalents and substitutions may be obvious to those skilled in the art. The true scope and definition of the invention is to be as set forth in the following claims.

I claim:

1. A workpiece holding assembly for attaching a wooden workpiece to a rotatable spindle, comprising in combination:

(A) a circular faceplate member having parallel planar faces spaced from each other a distance equal to the thickness of the faceplate member constituting workpiece mounting means for detachably mounting a workpiece to said faceplate member, said faceplate member being of a constant thickness substantially throughout its entire extent, said workpiece mounting means comprising a plurality of unthreaded holes extending through said faceplate member and screws inserted through said holes; and (B) a hub member having spindle attachment means for detachably mounting said hub member to a spindle, said spindle attachment means comprises an internally threaded cylindrical opening; and (C) connection means for detachably connecting said faceplate member to said hub member whereby said faceplate member is detachable from and reattachable to said hub member without detaching the workpiece from said faceplate member or detaching said hub member from the spindle, said connection means comprising an externally threaded hub spindle on said hub member with an annular shoulder in facing contact with said faceplate member and an internally threaded cylindrical aperture in said faceplate member, said hub spindle and said cylindrical aperture each being of a length essentially equal to the thickness of the faceplate member.

* * * * *